Nov. 8, 1949
P. BENDER
2,487,213
COMPENSATED BELLOWS ASSEMBLY
Filed Sept. 8, 1947
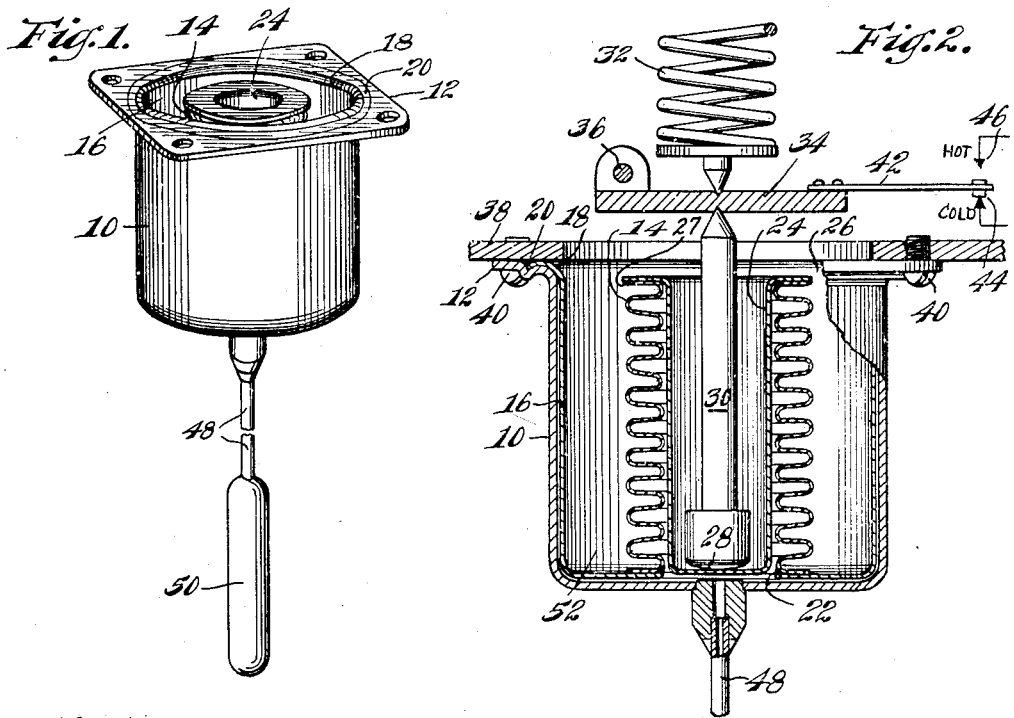
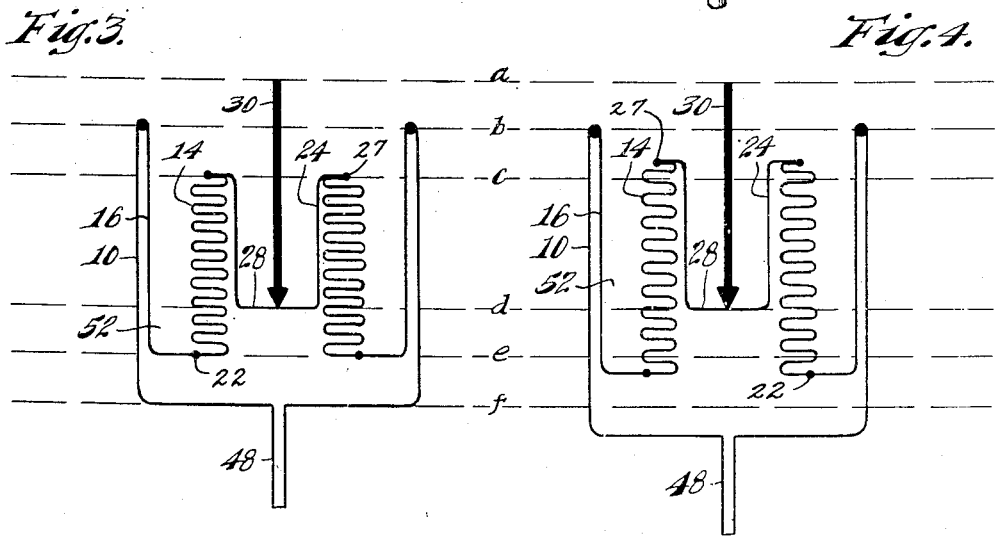
INVENTOR.
Paul Bender.
BY
Bair & Freeman
Attys.

Patented Nov. 8, 1949

2,487,213

UNITED STATES PATENT OFFICE 2,487,213

COMPENSATED BELLOWS ASSEMBLY

Paul Bender, Goshen, Ind., assignor to Penn Electric Switch Co., Goshen, Ind., a corporation of Iowa Application September 8, 1947, Serial No. 772,654

9 Claims. (Cl. 297—8)

1

This invention relates to a bellows assembly operable as an actuating element for control devices such as electric switches or valves wherein the assembly is compensated for temperatures ambient to the bellows housing.

One object of the invention is to provide a bellows and a bellows housing, together with interconnections between the two which are so shaped and so dimensioned, and which are made of materials having coefficients of thermal expansion so related to each other that compensation for ambient temperature rise or fall can be approximately perfectly compensated for, or over or under compensated for as required.

Another object is to provide a bellows housing with a liner telescopically mounted therein and formed of metal which is substantially inexpansible due to temperature rise, the bellows being connected to the liner and in turn being provided with a liner which is also of substantially inexpansible metal, and which in turn is operably connected with an actuating element to operate a control switch or the like.

A further object is to provide compensating cups in a bellows housing and a bellows operable to permit expansion of a fill within the assembly due to ambient temperature rise without producing movement of the actuating element mentioned in the preceding object.

With these and other objects in view, my invention consists in the construction, arrangement and combination of the various parts of my device whereby the objects contemplated are attained as hereinafter more fully set forth, pointed out in my claims and illustrated in the accompanying drawing, wherein:

Figure 1 is a perspective view of a compensated bellows assembly embodying my invention;

Figure 2 is a vertical sectional view through the bellows assembly showing it operably associated with an actuating element and parts of a control device (electric switch) merely by way of example.

Figure 3 is a diagrammatic view showing the position of the parts at normal temperature, and Figure 4 is a similar diagrammatic view showing the relation of the parts due to a rise in temperature ambient to the compensated bellows assembly.

Temperature responsive devices have been well known for many years which consist of an expansible housing formed of a metal cup provided with a bellows therein. Devices of this kind usually have a temperature sensing bulb connected by a capillary tube with the housing, and the bulb, the tube and the chamber formed between the bellows and the housing, are completely filled with a liquid or so-called "solid" charge as distinguished from a charge of gas or vapor. With such an arrangement the "fill" in the bulb, when it senses temperature rise, expands and is displaced along the capillary tube into the bellows housing wherein it acts on the bellows to collapse the same thereby causing movement of its free end which movement is used to effect a corresponding movement of a control device such as a switch or valve.

By positioning the temperature sensing bulb in a compartment that is to be heated for instance, the temperature of the compartment may be controlled and maintained substantially constant by using the switch or valve to control the source of heat injection for the compartment. Such thermostats are likewise operable in a reverse manner for controlling the cooling of the compartment. The bellows and its housing may be located within the compartment or at some other point that may have an entirely different ambient temperature than the compartment itself.

Since there is a liquid fill in the capillary tube and the bellows assembly as well as in the bulb, the tube and assembly likewise respond to temperature changes ambient thereto. This results in inaccuracy of control and variation of the control point, depending on the temperature ambient to the tube and the bellows. The remedy for such a situation is to compensate the capillary tube for temperature ambient to it and to compensate the bellows assembly for temperature ambient to it. In place of the bellows assembly some control devices utilize diaphragm assemblies and heretofore these have been compensated and likewise the capillary tubes have been compensated for ambient temperatures. A diaphragm however has limited motion and many control devices require considerably more motion than is possible with a diaphragm assembly. I have therefore provided a bellows assembly with compensating means which can be used in conjunction with a temperature sensing bulb and a capillary tube compensating bulb of the kind just mentioned.

My compensated bellows assembly comprises a bellows housing 10 of the usual deep cup type having a mounting flange 12. A bellows therein is indicated at 14. Ordinarily the bellows has a closed lower end and its upper end is sealed as by soldering in relation to the open upper end of the bellows housing 10.

In the present invention, however, the manner of connection between the bellows and its housing is considerably different. My proposed connection consists of a bellows housing liner 16 which is likewise of deep cup shape having an out-turned flange 18 at its upper end soldered as at 20 to the mounting flange 12 of the bellows housing 10.

The bottom of the cup 16 is provided with a large central opening terminating in an interned annular edge 22 to which the lower end of the bellows 14 is soldered. Within the bellows I provide a bellows liner 24 having an out-turned flange 26 at its upper end soldered at 27 to the upper end of the bellows.

The closed inner end of the cup 24 indicated at 28 constitutes an actuating surface for a control device such as a switch S. Only the essential parts of the switch S are shown in Figure 2, comprising an actuating pin 3 opposing a range spring 32 and both engaging a switch arm 34 pivoted at 36. The pivot 36 is carried by a switch housing 38 to which the bellows housing is secured as by screws 40.

The arm 34 may be considered an actuating arm and may operate switch contacts, a valve or the like, etc., in order to perform the control functions. By way of example, a switch blade 42 is shown connected therewith and operable to close alternately against cold and hot contacts 44 and 46.

A capillary tube 48 is connected with the lower wall of the bellows housing 10 and communicates with the interior of the housing. A temperature sensing bulb 50 is connected with the other end of the capillary tube and communicates therewith. The space within the capillary tube and the bulb is thereby in communication with the space indicated at 52 within the bellows assembly, and the three spaces are completely filled with a liquid charge of suitable characteristics such as mercury or Alkazene.

The cups 16 and 24, in order to compensate the bellows assembly for ambient temperature change, are made of metal which is substantially inexpansible upon temperature rise, or has what is termed a low coefficient of thermal expansion. The bellows 14 and its housing 10 on the other hand are formed of metal having a relatively high coefficient of thermal expansion. By way of example, Invar and brass or stainless steel and brass, are suitable for this purpose.

The cup 16 telescopes within the cup 10 and is made to closely fit it so as to minimize the space 52, also contributing to minimization of this space the cup 24 is made to fit rather closely within the bellows 14. Free thermal expansion of all parts of the assembly however is quite necessary, so the fit is not made so close that any possible reduction of temperature would contract the housing 10 or the bellows 14 so that they would interfere with the free telescopic movement of the cups 16 and 24.

Referring to Figure 3 the parts are shown in the relative positions they assume as when ambient temperature is normal. Dash lines a, b, c, d, e, and f are shown which indicate the following:

a, upper end of actuating pin 30
b, fixed point or anchorage of housing 10 to switch housing 38
c, connection of upper end of bellows 14 to upper end of cup 24
d, position of lower wall 28 of bellows cup 24
e, connection of lower end of bellows to bottom wall of cup 16
f, bottom wall of cup 10.

When temperature rises it will tend to expand the liquid fill in the chamber 52 of the bellows assembly, and without compensation this would result in the increased volume of liquid expanding the bellows 15 and thereby moving its upper end away from its lower end. The final result would be lifting of the inner cup 24 a corresponding amount. This would result in the actuating pin 30 being lifted, thus changing the position of the switch due to temperature rise ambient to the bellows assembly whereas the desired response of the switch is to the bulb 50 only.

By selecting the elements 10, 14, 16 and 24 of proper materials as far as coefficients of thermal expansion in relation to each other is concerned, and by making them of the proper size and shape, compensation can be had however by effecting an enlargement of the chamber 52 to receive the enlarged volume of liquid without moving the lower wall 28 of the inner cup 24 upward. This condition is shown in Figure 4 wherein it will be noted that heat has caused the housing 10 to expand which results in its lower wall moving downwardly to take up a position lower than the line f. This occurs because the upper end of the housing is fixed at the line b. While the cup 16 is substantially inexpansible it does expand somewhat and that is indicated by its taking up a position slightly below its initial position indicated by the line e. Likewise the inner cup 24 will elongate slightly so that if perfect compensation is had, its lower wall 28 will remain at the line d but its upper end will move slightly above the line c. The bellows 14 being of brass or the like will expand which is represented by its lower end being lower than the line e and its upper end higher than the line c.

By the use of proper materials and proper dimensions of the parts, the slight expansion of the cups 16 and 24 and the greater expansion of the housing 10 and the bellows 14 will produce enlargement of the chamber 52 exactly the same amount as the increase in volume of the liquid therein resulting from the same ambient temperature that enlarges the parts of the bellows assembly. Thus perfect compensation is had as represented by the wall 28 remaining at the line d in Figure 4 and the upper end of the actuating pin 30 likewise remaining at the line a.

Figure 4 illustrates perfect compensation. In many instances it is desirable however to have slight over-compensation or slight under-compensation. Over-compensation can be had for instance by deepening the cups and under-compensation can be had by making them more shallow.

Figure 2 shows the relative proportions for perfect compensation with the use of brass and Invar and Alkazene. Other metals may result in over or under compensation when these proportions are adhered to. Thus a change of relative materials as well as dimensions may in any particular instance produce the desired over or under compensation, whereas a change in dimensions may also be made to accomplish this result.

From the foregoing specification it will be obvious that I have provided a bellows and its housing with means to compensate the assembly for a change in temperature ambient to the bellows assembly itself. When such a device is used in connection with compensated capillary tubing the result in the control structure is extremely accurate in its response to temperature ambient to the temperature responsive bulb only. It is also a simple matter, knowing the coefficients of thermal expansions of the fill and the two metals used to form the bellows assembly, to predetermine the necessary dimensions for compensation to secure either perfect compensation or over or under compensation as desired.

Some changes may be made in the construction and arrangement of the parts of my compensated bellows device without departing from the real spirit and purpose of my invention, and it is my intention to cover by my claims any modified forms of structure or use of mechanical equivalents which may be reasonably included within their scope.

I claim:

1. In a compensated bellows assembly, a bellows housing, a bellows therein, said housing and bellows being formed of a metal having relatively high coefficients of thermal expansion, and means to compensate said bellows and housing for ambient temperature comprising a liner for the housing and a liner for the bellows, said liners being formed of metals having relatively low coefficients of thermal expansion and being telescopically mounted in their respective housing and bellows, with the first liner secured to the housing and bellows, and the second liner secured to the bellows and having an actuating surface operatively connected with an actuating element.

2. In a compensated bellows assembly, a bellows housing, a bellows therein, and means to compensate said bellows and housing for ambient temperature comprising a liner for the housing and a liner for the bellows, said liners being telescopically mounted in their respective housing and bellows, the first liner secured to the housing and bellows, and the second liner secured to the bellows operably connected with an actuating element, said liners having a less coefficient of thermal expansion than said housing and bellows to effect such compensation.

3. In a bellows assembly, a bellows housing of high-expansion metal, a bellows therein, a liner of low-expansion metal for said housing having one end connected to it and its other end connected to said bellows and a liner of low-expansion metal for said bellows and having one end secured thereto, said second liner having an actuating surface spaced from said last connection and operably connected with an actuating element.

4. In a bellows assembly, a bellows housing of cup shape having a closed end and an open end, said open end being fixedly mounted, a temperature sensing bulb and a capillary tube communicating through said closed end with the interior of said bellows housing, a liner for said housing, said liner being formed of a metal having a lower coefficient of thermal expansion than said housing and sealed in relation to the open end of the housing and one end of said bellows being sealed in relation to the inner end of said liner, and a bellows liner sealed in relation to the other end of said bellows and being formed of a metal having a lower coefficient of thermal expansion than said bellows, said bellows liner having an actuating portion spaced from the connection thereof to said bellows, and a control device operatively connected with said actuating portion, the chamber in said bellows housing between it and said bellows, said capillary tube and said temperature sensing bulb being filled with a liquid charge.

5. In a bellows assembly of the character described, a bellows housing of cup shape having a closed end and an open end, said open end being fixedly mounted, a temperature sensing bulb and a capillary tube communicating through said closed end with the interior of said bellows housing, a liner for said housing, said liner being sealed in relation to the open end of said housing and said bellows being sealed in relation to the other end of said liner, a bellows liner sealed in relation to said bellows and having an actuating portion, and a control device operably connected with said actuating portion, said liner being of low-expansion material compared with said housing.

6. In a bellows assembly, a bellows housing of cup shape having a closed end and an open end, said open end being fixedly mounted, a temperature sensing bulb and a capillary tube communicating through said closed end with the interior of said assembly between said bellows and said housing, a liner for said housing formed of a metal having a lower coefficient of expansion than said housing and a bellows liner formed of a metal having a lower coefficient of expansion than said bellows, said bellows liner having an actuating portion for actuating a control device.

7. Means for compensating a bellows and its housing for temperatures ambient thereto comprising a connection between the bellows and the housing which connects the outer end of the bellows with the inner end of the housing and a connection between the bellows and an actuating element which connects the inner end of the bellows with a portion of the actuating element adjacent the outer end of the bellows, said connections being formed of metal having a substantially low coefficient of thermal expansion compared to said bellows and housing.

8. Means for compensating a bellows and its housing for temperature ambient thereto comprising a first connection between the bellows and the housing which connects the outer end of the bellows with the inner end of the housing, and a second connection between the bellows and an actuating element which connects the inner end of the bellows with a portion of the actuating element adjacent the outer end of the bellows, said connections being formed of metal having a substantially low coefficient of thermal expansion compared to said bellows and housing which have a relatively high coefficient of thermal expansion.

9. Means for compensating a metal bellows and its metal housing for temperature ambient thereto comprising a tubular metal connection element between the inner end of the housing and the outer end of the bellows, and a second connection element between the inner end of the bellows and an actuating element adjacent the outer end of the bellows, said connecting elements having a substantially lower coefficient of thermal expansion than said bellows and housing.

PAUL BENDER.

REFERENCES CITED

The following references are of record in the file of this patent:

UNITED STATES PATENTS

| Number | Name | Date |
| --- | --- | --- |
| 1,616,519 | Twombly | Feb. 8, 1927 |
| 1,798,192 | Clifford | Mar. 31, 1931 |
| 1,971,801 | Wantz | Aug. 28, 1934 |
| 2,331,464 | Pillo | Oct. 12, 1943 |